Figure 1:
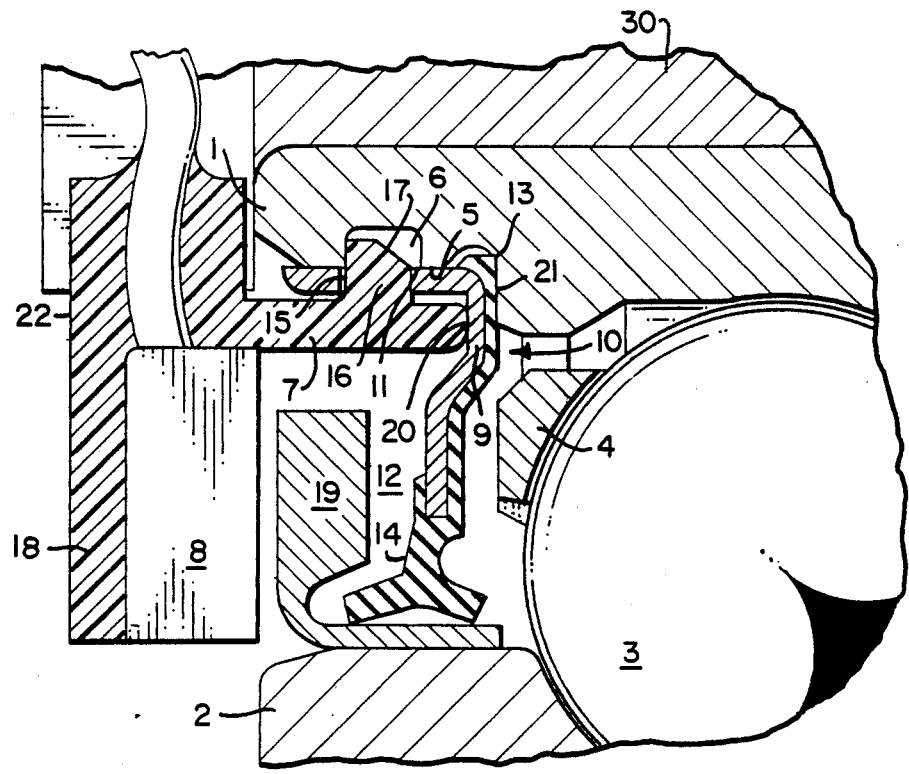

United States Patent [19]

Hajzler

[11] Patent Number: 4,946,295
[45] Date of Patent: Aug. 7, 1990

[54] BEARING WITH INFORMATION SENSOR

[75] Inventor: Christian Hajzler, Annecy, France

[73] Assignee: The Torrington Company, Torrington, Conn.

[21] Appl. No.: 449,166

[22] Filed: Dec. 13, 1989

[30] Foreign Application Priority Data

Dec. 20, 1988 [FR] France .................. 88 16795

[51] Int. Cl.⁵ .............................. F16C 32/00
[52] U.S. Cl. .................... 384/448; 384/477
[58] Field of Search ............ 384/446, 448, 477

[56] References Cited

U.S. PATENT DOCUMENTS

| | | | |
|---|---|---|---|
| 4,688,951 | 8/1987 | Guers | 384/448 X |
| 4,732,494 | 3/1988 | Guers et al. | 384/448 |
| 4,783,180 | 11/1988 | Hayashi | 384/448 |
| 4,850,722 | 7/1989 | Bayer | 384/477 X |
| 4,884,901 | 12/1989 | Harsdorff | 384/448 |

FOREIGN PATENT DOCUMENTS 2574501  6/1986  France .

Primary Examiner—Thomas R. Hannon
Attorney, Agent, or Firm—Frank S. Troidl

[57] ABSTRACT

A bearing with a rotating ring and a radially spaced fixed ring is mounted in the bore of a housing. A seal extends radially across the annulus between the bearing rings. An information sensor support is mounted in the housing and located adjacent one axial end of the bearing. The information sensor mounted in the information sensor support faces the seal. The seal has an axial portion with circumferentially separated holes. The axial portion extends toward the information sensor. The annular information sensor support has an axial portion extending toward the seal. This axial portion has a plurality of circumferentially separated radially extending retainers which pass through the seal holes and into an annular groove formed on the inside surface of the fixed ring.

4 Claims, 2 Drawing Sheets

BEARING WITH INFORMATION SENSOR

This invention relates to bearings with information sensors. More particularly, this invention relates to sealed bearings mounted in a housing with an information sensor.

French Pat. No. 2,574,501 describes a bearing in which the sensor is mounted on a sealing element mounted in a groove in the fixed ring.

The positions of the sensor and its connections are determined when the seal is assembled and cannot be changed later. Under these conditions, the sensor and the connecting elements too often occupy an angular position that is incompatible with the location of the circuit which processes the signals transmitted by the sensor.

According to this invention, this problem is solved in that the sensor is supported in an annular support which has an annular portion extending into the annulus between the rings. A seal, which is provided with an axial extension directed toward the sensor, constituting the cylindrical support for mounting the seal in the annulus, while openings distributed circularly on the surface of said support open into an annular groove of the fixed ring and are traversed radially by retainers passing through the openings and into said groove.

The bearing constructed in this manner makes it possible to mount the sensor and to remove it axially without requiring the previous disassembly of the seal and to position the sensor correctly as a function of the bearing environment.

Figure 2:
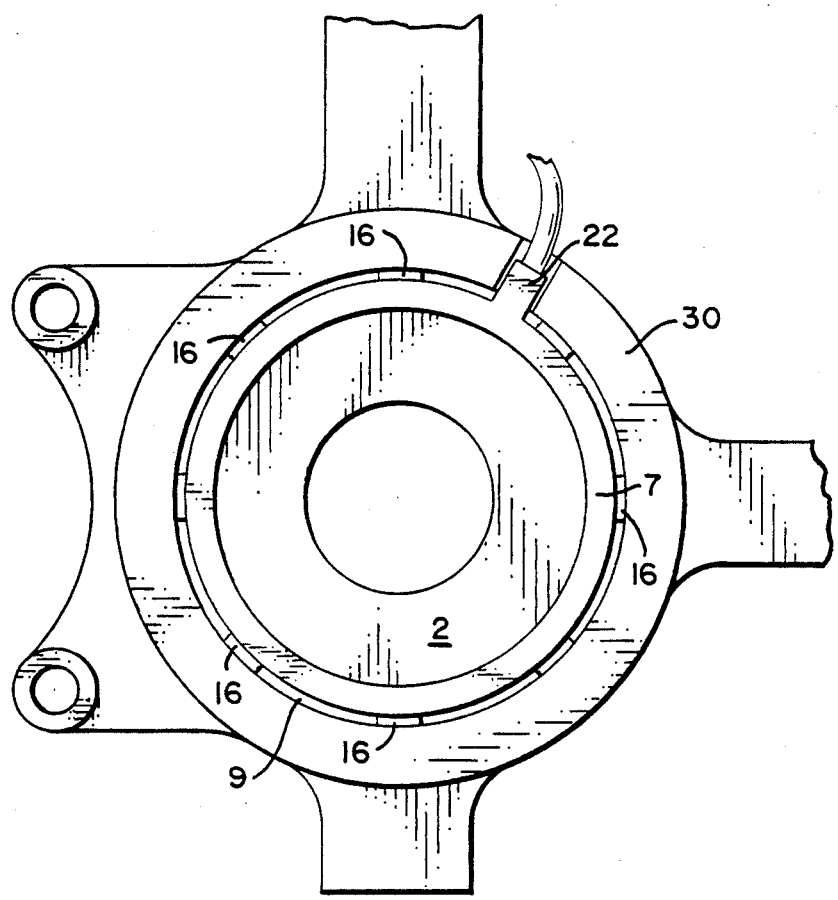

The invention as well as its advantages may be further understood by reference to the following description and drawings in which:

FIG. 1 shows a partial cross-section of a preferred embodiment of the invention; and FIG. 2 is a front view of the structure shown in FIG. 1.

Referring to the drawings, the bearing shown in FIG. 1 has an outer ring 1 and an inner ring 2, which can be, as desired, fixed or rotating depending on the use of the bearing.

Rings 1 and 2 have raceways for rolling elements 3 held in a cage 4, which keeps them at the proper angle and in the proper position.

Outer ring 1, which is assumed to be fixed in this embodiment of the invention, has a support surface 5 and a groove 6 for mounting an annular member 17 which holds a sensor 8.

The axial portion 7 of annular member 18 has an axial opening facing a brace 9 of a seal 10. As shown in the figure, brace 9 has a section extending axially toward sensor 8 and thus provides a cylindrical contact surface 11 for the seal in the annulus 12 separating rings 1 and 2.

The inner surface of ring 1 against which contact surface 11 of the seal rests has a groove 6 and a groove 13. Groove 13 receives and holds a packing 14, which is cast over brace 9.

Contact surface 11 of brace 9 has a plurality of circumferentially separated holes 15 which lead into groove 6.

Sensor 8 is adjusted to the proper angle and held in position by means of axial portion 7, which for that purpose, is provided with retaining pins 16, which extend radially through holes 15 into groove 6. As one example, the sensor 8 could be used to sense the magnetic field from an encoder 19.

Pins 16 are formed by tongues produced by making longitudinal cuts in the wall of the extension 7 and bending one end of the resulting sections radially towards the outside. Each pin 16 has a bevel 17. When the extension is inserted into annulus 12, the bevel 17 causes the pins 16 to be bent radially.

As can be seen from FIG. 1, the surface of end 20 of extension 7, which faces the inside of the bearing, exerts axial pretension either on brace 9 or packing 14 of seal 10. This pretension has the effect of flattening brace 9 or packing 14 against a shoulder 21 of ring 1. The elasticity of the material of which seal 10 is made also exerts an opposing force on surface 20 of the extension and permits pins 16 to be supported against the side of groove 6.

Annular extension 7 has a radial projection 22, which encloses the lead to sensor 8 and the lead for transmitting the information provided by the sensor. Projection 22 also facilitates the angular positioning of annular support 18. For this purpose, the lateral surface of housing 30 has a radial notch for receiving projection 22. Consequently, seal 10 is prevented from turning.

I claim:

1. In combination: a housing having a bore for retaining a bearing; a bearing in said bore having a fixed ring and a rotating ring radially spaced from the fixed ring to provide a fixed ring—rotating ring annulus; rolling elements in the annulus which roll on said rings; the fixed ring having an annular groove in its inside surface and axially spaced from the rolling elements; a seal extending radially across said annulus; a radially extending annular support mounted in the housing adjacent one axial end of the bearing; an information sensor mounted in said support and facing the seal, the seal having an axial portion extending toward the information sensor and having a plurality of circumferentially separated holes adjacent the fixed ring annular groove; said annular support having an axial portion extending toward the seal and having a plurality of circumferentially separated radially extending retainers passing radially through said seal holes and into the fixed ring annular groove.

2. The combination of claim 1, wherein the retainers are flexible locking pins.

3. The combination of claim 2, wherein the free end surface of said annular support axial portion is supported by contact against the seal.

4. The combination of claim 1, wherein the annular support has a radially extending outside projection lodged in a support notch of the housing to prevent the support and seal from rotating.

* * * * *